United States Patent

[11] 3,570,602

[72] Inventor William G. Halbert, Jr.
Butte, Mont.
[21] Appl. No. 3,098
[22] Filed Jan. 15, 1970
[45] Patented Mar. 16, 1971
[73] Assignee Tenneco Oil Company
Houston, Tex.

[54] SURFACTANT SOLUTION SECONDARY HYDROCARBON RECOVERY
9 Claims, 1 Drawing Fig.
[52] U.S. Cl. ............................................. 166/273,
166/275
[51] Int. Cl. ................................................E21b 43/20,
E21b 43/22
[50] Field of Search............................................. 166/268,
273—275; 252/8.55 (D)

[56] References Cited
UNITED STATES PATENTS

| | | | |
|---|---|---|---|
| 3,199,586 | 8/1965 | Henderson et al............ | 166/275X |
| 3,369,602 | 2/1968 | Fallgatter et al.............. | 166/273 |
| 3,372,748 | 3/1968 | Cook............................. | 166/273X |
| 3,414,053 | 12/1968 | Treiber et al. ................ | 166/273 |
| 3,474,864 | 10/1969 | Hurd............................. | 166/273X |

*Primary Examiner*—Ian A. Calvert
*Attorneys*—Eugene S. Coddou and Lee R. Larkin ABSTRACT: A method for secondary recovery of hydrocarbons from a formation penetrated by at least two well bores by utilizing a surfactant displacement flood followed by a caustic water flood. The surfactant of the first flood facilitates penetration of the formation, and the caustic water flood strips any adsorbed surfactant from the formation and inhibits dilution of the surfactant phase by the formation of an emulsion at the surfactant solution-caustic solution interface.

PATENTED MAR 16 1971
3,570,602
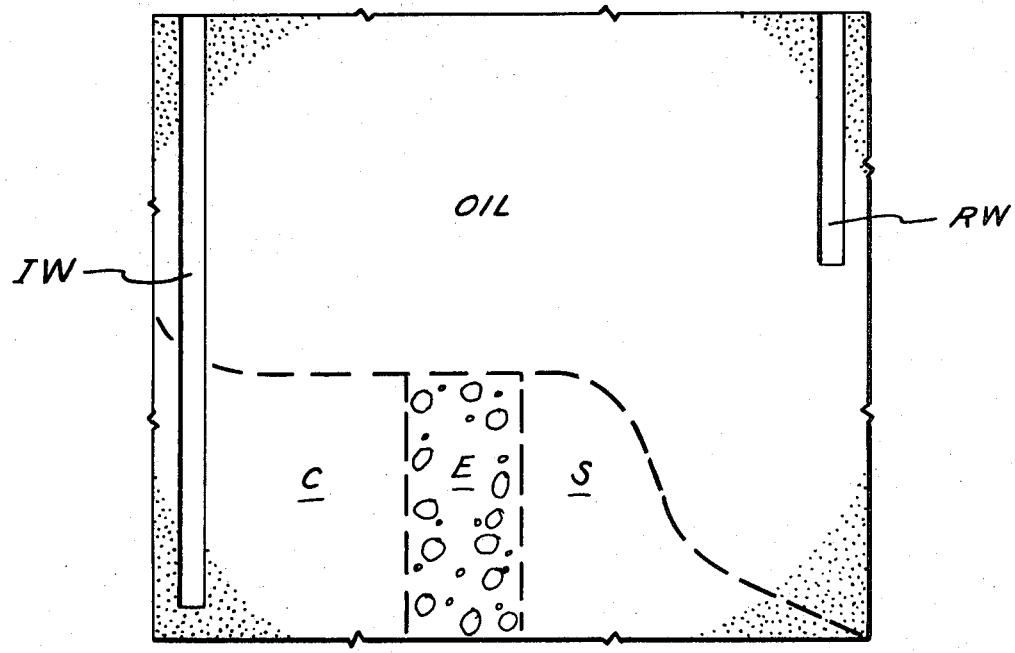
William G. Halbert
INVENTOR.
BY Eugene S. Coddou
ATTORNEY

3,570,602

SURFACTANT SOLUTION SECONDARY HYDROCARBON RECOVERY

BACKGROUND OF THE INVENTION

1. Field of the Invention

This invention relates generally to a method for recovering hydrocarbons from a subterranean formation. More particularly, the invention relates to a process for the secondary recovery of viscous oils from low permeability formations by the use of a surfactant solution in water followed by a caustic slug as the driving and desorption medium.

2. Description of the Prior Art

Secondary and tertiary recovery of low mobility hydrocarbons by high temperature fluid displacements, caustic stripping and surfactant solution flood is well known in the art. Surfactant and high temperature flooding methods reduce interfacial and surface tensions of the viscous low mobility oil in such formations, thereby improving the mobility of such oil through the formation.

Caustic and various surfactants have been used to strip and displace oil from producing formations. Problems have been experienced, however, with the amount of surfactant required for these methods. Dilution of the surfactant phase by drive water has been a major problem. In order to achieve proper penetration of low mobility formations, a high concentration of surfactant had to be used. The surfactant phase was also subject to dilution by the connate water present in the formation. Dilution of the surfactant phase reduces the ability of the slug to penetrate tightly packed formations. In order to overcome the dilution experienced in the formation, whether from connate water or from the drive water trailing the slug, a high concentration of surfactant had to be used. As might be expected, the higher the concentration of surfactant that is used, the more expensive this type of flooding becomes.

Prior art methods involving the use of high temperature fluid flood have proved ineffective in certain formations with certain viscosity oils. In tightly packed formations having high viscosity oils, high temperature fluid flooding of formations has sometimes resulted tin very little or no increase in the mobility of the oil.

Another problem encountered in prior art flooding techniques was the excessively high mobility ratio of the drive fluid. In such cases, the fluid would drive the stripping or displacing medium past the oil of the formation without effectively cleaning it out. A driving medium with a low mobility ratio would be more desirable in order to more effectively displace from the formation the oil remaining therein.

Still another problem with surfactant flooding is the loss of surfactant to the formation. This surfactant remains in the formation due to adsorption at the immobile liquid-liquid and solid-liquid interfaces. The surfactant adsorbed at these points was forever lost to the operator because it could not be recovered from the formation without a great deal of expense.

SUMMARY OF THE INVENTION

An object of the invention is to provide an improved method for the secondary recovery of hydrocarbons from oil bearing formations which overcomes the shortcomings of the prior art noted above and which has the advantages which are noted hereinafter. More specifically, the object is to provide an improved oil recovery process which permits slugs of dilute aqueous surfactant solution to be propagated through a reservoir without loss of slug integrity due to absorption and dilution.

Briefly stated, the method of the invention includes the step of injecting a slug of surfactant dissolved in water into the formation through a first of at least two well bores, to thereby displace the hydrocarbons toward a second well bore. The method also includes the step of injecting a slug of aqueous caustic, having a basicity at least about 1.5 pH levels greater than that of the native formation water, into the formation through the first well bore, to thereby further displace the hydrocarbons and the surfactant toward the second bore, whereby an in situ emulsion is formed between the surfactant slug and the caustic slug. Another step included in displacing the slugs through the formation by injecting a driving fluid through the first well bore, whereby the integrity of the surfactant slug is maintained by the caustic slug. Still another step included is producing the hydrocarbon from the formation through another of the well bores.

In certain embodiments of the invention, the surfactant injection step includes injecting a polyoxyethylene-polyoxypropylene copolymer surfactant with the water solvent. Other embodiments include injection of the polyoxyethylene-polyoxypropylene copolymer surfactant in a concentration of about 50—200 parts per million in water. Further embodiments include injection of a surfactant selected from the group of water and oil soluble nonionic ethylene oxide-propylene glycol detergents having an average molecular weight of about 2,900.

In the preferred embodiments, the size of the surfactant slug is about 5 percent to 20 percent of the pore volume of the formation, and the size of the aqueous caustic slug is 10 percent to — 20 percent of the pore volume of the formation. Preferably, the basicity of the aqueous caustic slug is in the range of about 1.5—2.5 pH levels higher than that of the brine water native to the formation.

BRIEF DESCRIPTION OF THE DRAWING

The process may be further understood by reference to the drawing which is a schematic cross-sectional view of an oil bearing formation in which the process of the invention is represented.

DESCRIPTION OF THE PREFERRED EMBODIMENT

The drawing represents an oil bearing formation from which oil is desired to be secondarily recovered. IW represents an injection well and RW represents a recovery well in the formation.

The movement of the injected substances is from left to right in the drawing. The first substance injected is the aqueous surfactant solution S. This injection is followed by the aqueous caustic solution C. At the moving interface of these two injected solutions, a low mobility oil-external emulsion E is formed. Oil-external emulsion E provides an efficient driving means and barrier to prevent dilution of surfactant S. As surfactant S is driven into the formation, the oil in the formation is recovered from recovery well RW.

Any chemical slug-type oil recovery process is most economically efficient at an optimum range of chemical concentrations and slug sizes. Optimal conditions are a function of a rock's capillary properties, the reservoir fluid's chemical properties, the chemical properties of the injected fluids and the well spacing in the formation.

A reservoir's response to modified water flooding must be established by laboratory investigation. Surfactant selection and caustic concentration requirements can be easily established. For low mobility (caustic-emulsifiable) oil in unfractured low permeability formations, the optimum surfactant concentrations are between 50—200 parts per million in water. The size of the slug of surfactant and water should be 5 percent to 20 percent of the pore volume of the formation.

The caustic slug which follows the surfactant slug promotes oil-water emulsification and desorption of adsorbed surfactant. Optimum concentration for the caustic solution is that amount of caustic necessary to raise the pH level of the aqueous slug 1.5—2.5 pH levels higher than that of the water native to the formation. The size of the aqueous caustic slug should vary between 10 percent—20 percent of the pore volume of the formation.

The system herein disclosed reveals many advantages over the prior art. The small volume of dilute surfactant necessary for this method provides a very economical method of secondary recovery. Chemical activity of the injected surfactant is concentrated at the displacement front, and the driving slug generates and stabilizes the emulsion created between the two slugs. This activity causes a more favorable mobility ratio through the action of the surfactant on the interfacial and surface tension of the liquids in the formation. A small slug of dilute surfactant, when displaced by an emulsion and a small slug of caustic solution, can yield approximately the same oil recovery as that realized by continuous or large slug injection processes.

The caustic solution injected behind the surfactant promotes oil-water emulsification and effects desorption of adsorbed surfactants. The effective viscosity of the water-in-oil emulsion is greater than the viscosity of the components. The resulting viscosity of the emulsion is generally 1.2 to 5 times greater than the viscosity of the emulsion's constituent phases. The effect of the emulsion created by the aqueous caustic phase and the surfactant phase is that the oil is displaced by a less mobile driving force. Areally and volumetrically more oil is displaced from the formation due to the improved mobility ratio caused by the emulsion. This high mobility is a considerable advantage over high temperature fluid flood in formations where oil viscosity is high, where rock and immobile fluids possess a high heat capacity, and where the formation is not fractured.

In the past, chemical water flooding has usually been thought of as a tertiary recovery method. This invention shows a process which produces maximum benefit of injected chemicals under secondary recovery conditions.

Further modifications and alternate embodiments of the invention will be apparent to those skilled in the art in view of this description. Accordingly, the foregoing is to be construed as illustrative only of certain embodiments of the invention.

I claim:

1. In a process for secondary production of hydrocarbons from an oil bearing formation penetrated by at least two well bores, the combination of steps comprising:
   injecting a slug of surfactant dissolved in water into said formation through a first well bore to thereby displace said hydrocarbons toward a second well bore;
   injecting a slug of aqueous caustic having a basicity of at least about 1.5 pH levels greater than that of the native formation water into said formation through said first well bore, to thereby further displace said hydrocarbons and said surfactant slug toward said second well bore, whereby an in situ emulsion is formed between said surfactant slug and said caustic slug;
   displacing said slugs through said formation by injecting a driving fluid through said first well bore, whereby the integrity of said surfactant slug is maintained by said caustic slug; and
   producing said hydrocarbons from said formation through said second well bore.

2. The invention as claimed in claim 1 wherein said surfactant injection step includes injecting a polyoxyethylene-polyoxypropylene copolymer surfactant with said water solvent.

3. The invention as claimed in claim 2 wherein the concentration of said polyoxyethylene-polyoxypropylene copolymer surfactant in said water is about 50—200 ppm.

4. The invention as claimed in claim 1 wherein said surfactant is selected from the group of water and oil soluble nonionic ethylene oxide-polypropylene glycol detergents having an average molecular weight of about 2,900.

5. The invention as claimed in claim 1 wherein the size of said surfactant slug is about 5 percent to 20 percent of the pore volume of said formation.

6. The invention as claimed in claim 1 wherein the size of said aqueous caustic slug is about 10 percent to 20 percent of the pore volume of said formation.

7. The invention as claimed in claim 1 wherein the basicity of said aqueous caustic slug is about 1.5 to 2.5 pH levels higher than that of the brine water native to said formation.

8. The invention as claimed in claim 1 wherein the size of said surfactant slug is about 5 percent to 20 percent of the pore volume of said formation and the size of said aqueous caustic slug is about 10 percent to 20 percent of the pore volume of said formation.

9. The invention as claimed in claim 8 wherein:
   said surfactant is selected from the group of water and oil soluble nonionic ethylene oxide-propylene glycol detergents having an average molecular weight of about 2,900; and
   the basicity of said aqueous caustic slug is about 1.5 to 2.5 pH levels higher than that of the brine water native to the formation.